US011432166B2

(12) United States Patent
Frank et al.

(10) Patent No.: US 11,432,166 B2
(45) Date of Patent: Aug. 30, 2022

(54) DETECTING COMMUNITY IN RADIO ACCESS NETWORKS WITH A PLURALITY OF VERTICES

(71) Applicant: Telefonaktiebolaget LM Ericsson (publ), Stockholm (SE)

(72) Inventors: Philipp Frank, Madrid (ES); Chin Lam Eng, Tokyo (JP); Mitchell Ho, Sydney (AU); Chee Wai Ng, Sydney (AU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1 day.

(21) Appl. No.: 16/636,658

(22) PCT Filed: Aug. 14, 2017

(86) PCT No.: PCT/EP2017/070581
§ 371 (c)(1),
(2) Date: Feb. 5, 2020

(87) PCT Pub. No.: WO2019/034232
PCT Pub. Date: Feb. 21, 2019

(65) Prior Publication Data
US 2020/0196168 A1    Jun. 18, 2020

(51) Int. Cl.
*H04W 24/00* (2009.01)
*H04W 24/02* (2009.01)
(Continued)

(52) U.S. Cl.
CPC ........... *H04W 24/02* (2013.01); *H04W 16/18* (2013.01); *H04W 24/10* (2013.01); *H04W 28/0268* (2013.01); *H04W 40/248* (2013.01)

(58) Field of Classification Search
CPC ..... H04W 24/02; H04W 16/18; H04W 24/10; H04W 28/0268; H04W 40/248
See application file for complete search history.

(56) References Cited

U.S. PATENT DOCUMENTS

| 2011/0081865 A1* | 4/2011 | Xiao | H04W 72/1205 |
| | | | 455/63.1 |
| 2012/0028664 A1* | 2/2012 | Zhang | H04W 16/14 |
| | | | 455/501 |

(Continued)

FOREIGN PATENT DOCUMENTS

EP    2445246 A1    4/2012

OTHER PUBLICATIONS

Pons, P. et al., "Computing Communities in Large Networks Using Random Walks", Dec. 12, 2005, pp. 1-20, retrieved on: Feb. 4, 2020, retrieved from: https://arxiv.org/abs/physics/0512106v1.

(Continued)

*Primary Examiner* — Pakee Fang
(74) *Attorney, Agent, or Firm* — Coats & Bennett, PLLC

(57) ABSTRACT

The present invention refers to a method and apparatus and computer program for detecting communities in a radio access network with a plurality of vertices (C, BBU), wherein the method comprises calculating (S11) relationship strengths (31, 41) for network connections between the vertices (C, BBU) by executing a connection strength calculation process by analyzing performance factors, decisive for network performance including cell coverage overlap, signal strength, and inter-cell interference. The method further creates (S12) a network graph with nodes, representing the vertices (C,BBU) in the network and edges, representing the network connections based on the calculated relationship strengths (31, 41) and applies (S13) an extended iterative disjoint community detection algorithm for clustering nodes into communities, wherein in each iteration imposed one or more constraints for clustering cooperating nodes into the same community are analyzed (S14).

13 Claims, 9 Drawing Sheets

(51) Int. Cl.
  *H04W 16/18* (2009.01)
  *H04W 24/10* (2009.01)
  *H04W 28/02* (2009.01)
  *H04W 40/24* (2009.01)

(56) References Cited

U.S. PATENT DOCUMENTS

| | | | | |
|---|---|---|---|---|
| 2012/0201191 A1* | 8/2012 | Seo | ......................... | H04L 25/24 370/315 |
| 2013/0198191 A1* | 8/2013 | Lara Hernandez | ... | G06F 16/285 707/737 |
| 2013/0244670 A1* | 9/2013 | Biermann | ............. | H04W 24/02 455/446 |
| 2013/0267239 A1* | 10/2013 | Stancanelli | ............ | H04B 7/024 455/452.1 |
| 2015/0311961 A1* | 10/2015 | Li | ......................... | H04B 7/024 370/230 |
| 2016/0262038 A1* | 9/2016 | Dunn | .................... | H04W 24/02 |

OTHER PUBLICATIONS

Rosvall, M. et al., "The Map Equation", Sep. 23, 2009, pp. 1-9, retrieved on Feb. 4, 2020, retrieved from: https://arxiv.org/abs/0906.1405.

Yang, Z. et al., "A Comparative Analysis of Community Detection Algorithms on Artificial Networks", Scientific Reports, vol. 6 Article No. 30750, Aug. 1, 2016, pp. 1-16, Springer Nature.

* cited by examiner

DETECTING COMMUNITY IN RADIO ACCESS NETWORKS WITH A PLURALITY OF VERTICES

TECHNICAL FIELD

The present invention refers to radio access networks and in particular to automatic detection of communities of baseband units and cells for improving network performance.

BACKGROUND

Mobile telecom networks usually consist of a core network and a radio access network for providing communication services for mobile communication devices. A radio access network (in the following also abbreviated as RAN) implements the radio access technology. Conceptually, it resides between a device such as a user equipment (UE), a mobile phone, a computer, or any remotely controlled machine and provides connection with the core network.

The term "baseband unit" is to be construed as a digital unit which processes baseband signals in a mobile network. A typical wireless "base station" consists of the baseband processing unit and the RF processing unit (often called remote radio unit—RRU). With Centralized RAN, Elastic RAN, or Cloud RAN, the baseband units are often centralized in one location instead of having at each site a separate baseband unit. Hence, baseband unit and RF processing units are not anymore located at the same location (or nearby). The baseband unit is connected to the RF processing unit via optical fibre. New generation of baseband units may handle not only 3 cells (=1 site or base station) but many.

A cell provides radio coverage over a geographic area. Often, at one site or physical location (e.g. rooftop) several antennas (pointing in different directions) are deployed, whereby each antenna is connected to the RF processing unit (or several units). Let's assume the antennas are covering three sectors (120 degree), then this site has three cells.

One type of RAN is a cloud-based RAN (C-RAN) offering and introducing connectivity between baseband units which allows to create cooperating baseband unit clusters and supporting different radio standards, inter alia 2G, 3G, 4G. The second generation (2G) technology for wireless transmission includes inter alia the feature of simple text messaging, whereas the third generation (3G) allows for Web browsing, email, video downloading, picture sharing and others and the fourth generation (4G) offers at least 100 Megabits per second and up to 1 Gigabit per second. A cloud-based RAN may have a centralized or a distributed or hybrid architecture and may inter alia use Coarse or Dense Wavelength Division Multiplexing (CWDM/DWDM) technology, and mmWave-technology to allow transmission of a baseband signal over long distance. For the RAN network design, selected and distinguished groups or clusters of cells and baseband units are set up. The creation of clusters enables the usage of borderless coordination by means of Carrier Aggregation and/or Uplink/Downlink Coordinated Multi-Point (CoMP) features.

Carrier Aggregation is a technique which aims at combining (aggregating) several separate carriers or frequencies (e.g. LTE carriers each of up to 20 MHz) for achieving high data rates and to increase the transmission bandwidths over those that can be supported by a single carrier or frequency channel. With Carrier Aggregation (CA) data is sent in parallel over several frequencies bands. With CA it is possible to increase the total bandwidth supported in both the downlink and the uplink direction and supporting a greater number of frequency bands and combinations of frequency bands. The carriers may be in contiguous elements of the spectrum, or they may be in different bands. For applying CA, it is necessary to coordinate the RAN structure, and in particular to define the cells with sufficient overlap.

CoMP summarizes technical approaches and features that enable the dynamic coordination of transmission and reception over a variety of different base stations. The aim is to improve overall quality for the user as well as improving the utilisation of the network. Essentially, CoMP turns the inter-cell interference into a useful signal, especially at the cell borders where performance may be degraded. For being able to apply CoMP features, it is necessary to coordinate cells and baseband units, inter alia for mitigating interference.

The task of configuring and designing an access network is highly complex and existing state-of-the-art network design approaches show major problems. This is due to the massive number of variables (nodes and their relations) to be analysed. It requires an understanding and characterization of cluster coordination and their underlying technical structures to improve global network performance (versus local optima). Finding an optimum cell cluster and baseband unit cluster among millions of possible permutations, considering inter-cell radio frequency coverage overlap, signal quality, multiple frequency bands, and eNodeB (Evolved Node B) cell and baseband unit capacity limitations, impose a tremendous challenge.

In network design, a common practise is to cluster cells and baseband units into communities. Cells and baseband units can be also denoted as vertices in this context. Community detection can thus be applied to discover the natural and hidden structures within the network which are often referred to as communities. These communities are groups of vertices which have a strong relationship and hence are tightly connected among themselves but are only sparsely connected with respect to the rest of the network. The data sets describing these networks comprising multiple baseband units and multiple cells are usually immense and it is therefore critical to apply automated and efficient community detection methods to obtain meaningful results and a sophisticated understanding of complex systems. In a distributed RAN architecture (typical LTE deployment) a base station consists of a baseband unit and RF unit which are located at the same or closely related physical location (e.g. RF units on rooftop and baseband unit in an equipment room of the same building). Often 3-sector antennas are deployed, which means 3 cells per baseband unit.

SUMMARY

An object of the present invention is to provide a method and means for improving network design which overcome or at least alleviate the aforementioned shortcomings and limitations.

The invention is embodied in the independent claims. Advantageous embodiments with further features are described in the dependent claims.

According to a first aspect of the invention, the need, mentioned above, is satisfied by a method for detecting communities in a radio access network of a mobile telecom network with a plurality of vertices. The method comprises calculating relationship strengths for network connections between the vertices by executing a connection strength calculation process by analyzing performance factors, decisive for radio access network performance.

The method further comprises a step of creating a network graph with nodes, representing the vertices in the network and with edges, representing the network connections based on the calculated relationship strengths, as mentioned above.

The method continues with applying an extended iterative disjoint community detection algorithm for clustering nodes into communities, wherein in each iteration imposed one or more constraints for clustering nodes into the same community are analyzed.

The method enhances current existing disjoint community detection methods by allowing to impose different constraints on the detected communities. To do so, a new algorithm, namely the extended iterative disjoint community detection algorithm is proposed to evaluate neighbor nodes (representing network vertices) or cooperating nodes which can be potentially merged (clustered) into a community. Based on this evaluation neighbor nodes or cooperating nodes can be restricted from being merged (clustered) together into a community in case the imposed constraints cannot be fulfilled. Thus, the proposed method enables the application of community detection for many real-world applications, in particular for the design and optimization of mobile networks.

According to a preferred embodiment, the performance factors comprise (intra-frequency and/or inter-frequency) cell coverage overlap, (intra-frequency and/or inter-frequency) neighbor cell signal strength, and inter-frequency neighbor signal quality, to achieve an optimal RAN design which optimizes the network performance.

According to a preferred embodiment of the present invention, the radio access network (RAN) of the mobile telecom network may be or be part of or comprise a cloud-based radio access network, supporting a core network, like 5G or LTE or other standards. The RAN may be implemented as coordinated, centralized or elastic RAN.

According to another preferred embodiment, the method further comprises providing the one or more constraints for clustering nodes into the same community. The constraints may be pre-definable.

According to another preferred embodiment of the present invention, the nodes can be at least of a first type and a second type. A node of the second type may comprise or can be connectable to multiple nodes of the first type. A network may comprise of different types of vertices, comprising for example cells and baseband units. A cell as an example for a first type of vertex in the mobile network may be represented in the graph as a first type of node. A baseband unit as an example for a second type of vertex in the mobile network may be represented in the graph as second type of node. A vertex/node of the second type may comprise or can be connectable to multiple vertices/nodes of the first type. An example for a vertex/node of a first type is a cell of a radio access network and an example for a vertex/node of a second type is a baseband unit of a radio access network. In a typically radio access network, a baseband unit comprises or is connectable to multiple cells. Unless specifically indicated, it is not further differentiated between the terms vertex and node in the context of this invention.

According to a preferred embodiment, the extended iterative disjoint community detection algorithm is firstly applied to nodes of the first type to provide an intermediate result with communities of nodes of the first type. The intermediate result serves as input for secondly applying the extended iterative disjoint community detection algorithm to the nodes of the second type. The one or more constraints imposed in the first application of the extended algorithm may be same or different to the one or more constraints imposed in the second application. This has the advantage that the same extended iterative disjoint community detection algorithm may be firstly applied to cluster the first type nodes (cells) in one respective baseband unit community and may then secondly be applied to cluster the baseband unit communities as a second type of node in one respective community of baseband units. The first step has an intermediate result which serves as input for the second step. This helps to provide an efficient implementation for providing a result dataset with an optimized network configuration.

According to another preferred embodiment of the present invention, the connection strength calculation process considers network performance measures. In particular, the measures can relate to signal measurements, taken dynamically during operation of the network. The measures or measurements may be made by the cooperation node and/or may be made by further nodes and transferred to the cooperation node as input into the connection strength calculation process.

According to another preferred embodiment of the present invention, the connection strength calculation process for detecting baseband communities is based on analysing a set of pre-definable performance factors for achieving an optimal carrier aggregation network performance. The performance factors may comprise at least one of inter-frequency cell coverage overlap and signal quality, number of inter-frequency cell relationships, and physical cell distance.

According to another preferred embodiment of the present invention, the connection strength calculation process for detecting cell communities is based on analysing a set of pre-definable performance factors for achieving an optimal network performance, in particular with respect to coordinated multipoint and carrier aggregation techniques, and may comprising at least one of intra- and inter-frequency cell coverage overlap, signal strength and quality (which measures inter-cell interference), as well as physical cell distance.

According to a preferred embodiment, the set of pre-definable performance factors is extendable. Preferably, this is possible also during operation of the community detection process. This feature makes the method flexible and adaptable to new network settings as other or additional performance factors may be considered anytime.

According to another preferred embodiment of the present invention, the one or more constraints for clustering cells as first type nodes in one baseband unit as second type node and which serves as community during cell clustering may be pre-defined and refer to capacity requirements of the respective baseband unit and may comprise at least one of: a maximum and/or minimum number of cells per baseband unit, a maximum number of connected users per baseband unit, a maximum number of VoIP users per baseband unit, a maximum number of scheduling entities and/or scheduling messages per baseband unit. According to a preferred embodiment, the set of pre-definable constraints is extendable. Preferably, this is possible also during operation of the community detection process. This feature also hast the advantage of making the method flexible and adaptable to new network settings as other or additional constraints may be considered anytime.

According to another preferred embodiment of the present invention, the one or more constraints for clustering cooperating baseband units as second type nodes in one community (e.g. cluster of baseband units) may be pre-defined and refer to capacity requirements of the respective community and may comprise: a maximum and/or minimum number of baseband units per community. Alternatively, the one or more constraints may be provided without pre-definition. The one or more constraints may be changed or extended dynamically during network operation.

According to another preferred embodiment of the present invention, the detected cell communities are used to define baseband units in such a way that the network performance is improved. This may be achieved by different means, comprising carrier aggregation. In order to mitigate inter-cell interference, uplink and/or downlink Coordinated Multi-Point features for those baseband units may be applied. This has the technical advantage and effect that optimal cell clustering leads to improved network performance within the baseband units.

According to another preferred embodiment of the present invention, the detected baseband unit communities are used for coordination of the plurality of baseband units in order to improve network performance by means of carrier aggregation and in order to mitigate inter-cell interference by applying uplink and/or downlink CoMP features. The term CoMP stands for Coordinated Multipoint and refers to techniques which enable the dynamic coordination of transmission and reception over different cooperating cells and baseband units.

Moreover, the invention is embodied in a coordination apparatus for detecting communities in a mobile telecom network with a plurality of vertices, like cells and baseband units, wherein the coordination apparatus is adapted to calculate relationship strengths for network connections between the vertices by executing a connection strength calculation process by analysing performance factors, decisive for network performance (e.g. including cell coverage overlap, signal strength, and inter-cell interference). The coordination apparatus is further adapted to create a network graph with nodes, representing the vertices in the network and with edges, representing the network connections based on the calculated relationship strengths. Finally, the coordination apparatus is adapted to apply an extended iterative disjoint community detection algorithm for clustering nodes into communities, wherein in each iteration imposed one or more constraints for clustering cooperating nodes into the same community are analysed.

In particular, the coordination apparatus may be adapted to execute the method with all or selective steps as mentioned above. In particular, the coordination apparatus may be adapted to perform the steps of a method according to any of the aspects mentioned above. The coordination apparatus may be implemented in a digital unit, which serves as coordinating instance of the network, in particular, the RAN.

The coordination apparatus may comprise subunits with different functionality. The subunits may be integrated into one common unit.

The coordination apparatus may comprise a strength calculator, which is adapted for calculating relationship strengths for network connections between the vertices by executing a connection strength calculation process by analysing performance factors, decisive for network performance including cell coverage overlap, signal strength, and inter-cell interference.

The coordination apparatus further may include a memory for storing a network graph with nodes, representing the vertices in the network and with edges, representing the network connections based on the calculated relationship strengths.

The coordination apparatus further may include a processor which is adapted for applying an extended iterative disjoint community detection algorithm for clustering nodes into communities, wherein in each iteration imposed constraints for clustering cooperating nodes into the same community are analysed.

The coordination apparatus may further comprise an output unit for outputting the result.

The invention is furthermore embodied in system for detecting communities in a radio access network of a mobile telecom network, comprising a plurality of cells as a first type of vertex in the mobile telecom network. and a plurality of baseband units as a second type of vertex in the mobile telecom network. The system comprises a coordination apparatus as mentioned above.

Finally, the invention is furthermore embodied in a computer program loadable into a processor or a coordination apparatus, as mentioned above. The computer program comprises code adapted to perform the steps of the method mentioned above when processed by the processor or the coordination apparatus. The processor may be implemented as physical or as virtual appliances.

The invention has the technical advantage of enabling new network and design automation services, such as RAN cell and/or baseband unit clustering design. The solution also allows to fully automate the complex analytics in the design process. The application of the extended iterative disjoint community detection algorithm has the technical advantage that the communities are detected such as that cooperation of the cells and/or baseband units may be optimized by clustering only those entities (cells and/or baseband units) which show a strong cooperation, which may be measured dynamically even during network operation.

BRIEF DESCRIPTION OF THE DRAWINGS

In the following, the invention will further be described with reference to exemplary embodiments illustrated in the figures, in which.

DETAILED DESCRIPTION

Figure 1:
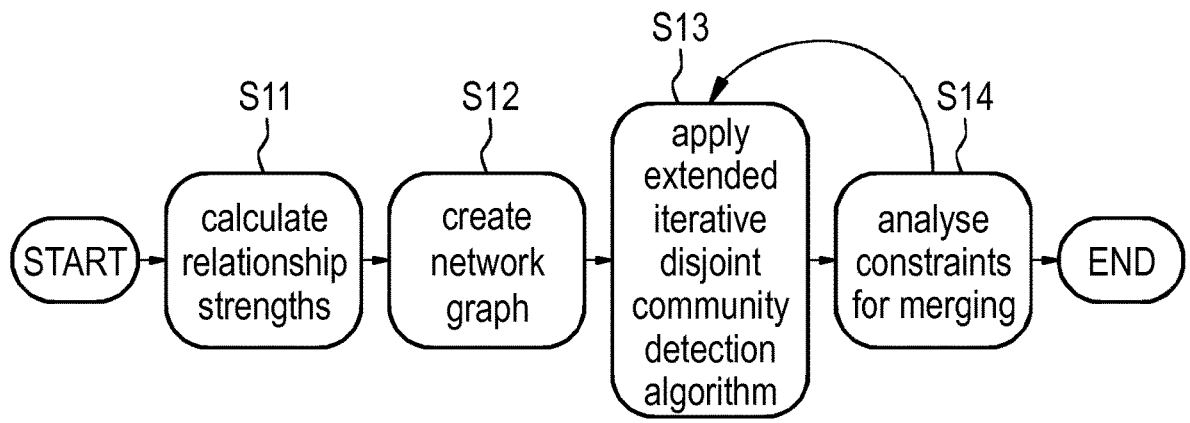
FIG. 1 is a flow chart of a method for detecting communities in a mobile telecom network according to an embodiment of the invention.

In the following description, for purposes of explanation and not limitation, specific details are set forth, such as particular network environments and communication standards etc., in order to provide a thorough understanding of the current invention. It will be apparent to one skilled in the art that the current invention may be practiced in other embodiments that depart from these specific details. For example, the skilled person will appreciate that the current invention may be practiced for any wireless network like for example LTE, 5G or even older standards like 3G networks. Further the invention is applicable for implementation in any digital unit used for design or optimization of radio access networks. The invention may also be used in a cloud based radio access network (RAN) or in future radio access networks or for core network software features. In the following detailed description, the examples mainly refer to the embodiment, in which the method is executed in a central control node, which is responsible for coordination of network vertices. However, the proposal suggested in this application also applies as well if the method is at least partly executed on the respective vertex, like for example on a cell (node) or baseband unit (node). The solution may be used to carry out a fully automated RAN design service.

In order to provide a solution for the problem mentioned above, a network graph can be defined where nodes represent vertices of the telecom network, like cells and baseband units, respectively, and where edges (connections between the vertices) correspond to the relationship strength (connection quality) between the different cells or baseband units. A disjoint community detection algorithm can be applied to partition the graph into communities. In the case of cell clustering, a detected community corresponds to a group of cells—with strong relationship among each other—which have to be grouped into one baseband unit. Clearly, a cell cannot belong to multiple baseband units, hence overlapping community detection algorithms may not be applied for this problem. However, known disjoint community detection algorithms (e.g. Walktrap, InfoMap, Edge Betweeness) cannot impose any constraints on the detected communities. However, this is essential because most communication systems have certain technical constraints which must be considered. The invention extends these known disjoint community detection algorithms in several aspects, which will be explained below.

The invention, thus, provides a mechanism for providing a result dataset which is necessary for designing a RAN. The result dataset comprises a community or cluster of cells and a community or cluster of baseband units, which should be grouped together by considering that actual network constraints are fulfilled so that network performance is as good as possible with actual network conditions.

The invention inter alia relates to a method for dynamically detecting communities in a radio access network of a mobile telecom network, with a plurality of vertices, like cells and baseband units or other types of entities of the network to be clustered for improving coordination of the entities for finally improving network performance. The method comprises calculating relationship strengths for network connections between the vertices by executing a connection strength calculation process by analyzing performance factors which have been judged to be decisive for network performance. The method further comprises creating a network graph with nodes, representing the vertices in the network and with edges, representing the network connections based on the calculated relationship strengths, as mentioned above. The method continues with applying an extended iterative disjoint community detection algorithm for clustering nodes into communities, wherein in each iteration imposed constraints for merging cooperating nodes into the same community are analyzed. In the following the term "merging" is used, which is the same as "clustering" or "grouping" in the context of detecting communities.

The invention is based on considering network performance characteristics. In particular, the strength of network connections between cells and baseband units, respectively, should be considered when clustering cells and baseband units for being able to consider the actual technical implementation. In case a network design already exists, means should be provided to optimize network design based on dynamically detected constraints. For example, the following constraints should be considered: Minimum/maximum number of cells per community (per baseband unit), Minimum/maximum number of baseband units per community (per coordination cluster), Baseband capacity limitations, i.e. that the members of a communities (here: cells grouped into baseband units) must satisfy a limit on number of connected users, number of Voice over Internet Protocol (VoIP) users, scheduling entities, signalling messages etc. Finally, operating costs should be minimized.

Furthermore, the method, the apparatus and the system of the invention can be used for improving a network design but also for creating a new design in case a Cloud RAN architecture is not yet deployed in the network.

In the following a definition of terms used with this application is given.

The invention concerns radio access networks (RAN). In a preferred embodiment, the invention concerns a cloud-based coordinated radio access network. The RAN may be implemented as an elastic RAN or a centralized RAN.

The relationship strengths refer to weights which are imposed on the edges in the created network graph. The relationship strengths are calculated by means of executing an automatic connection strength calculation process. This may be done by analysing all relevant performance factors which have been judged to be decisive for network performance. According to a preferred embodiment, the method includes an evaluation phase, in which configurations are possible. In this phase, it is possible to define which of the performance measures should be considered when calculating the relationship strength. The different factors may be prioritized to specify which of them is more essential for evaluating the quality of the respective relationship. The relationship strength and thus the respective weight in the graph considers various performance factors to achieve an optimal network performance in terms of Carrier Aggregation and/or Uplink/Downlink CoMP.

The term "performance factors" or short "factors" refer to a set of different factors which are judged to be decisive for network performance. Here again, in an evaluation phase, the factors may be defined by a user. Alternatively, they may be predefined. The factors may refer to node related characteristics and/or connection related characteristics. The factors may be changed, even during operation. For example, an extension of the actual set of factors is possible with further new factors. The factors, after having been added to the set are then automatically used for calculating relationship strengths. In a preferred embodiment, a predefined set of factors at least comprises cell coverage overlap, signal strength, and inter-cell interference.

Vertices refer to real, i.e. physical or virtual, cooperating network elements, like baseband units or other digital units, whereas nodes are part of the network graph, which is a formal representation of the real network. The graph comprises nodes as a representation of the vertices. The nodes are connected via "edges" in the graph. The edges in the graph represent "real" network connections of the telecom network.

A network graph is created automatically with weights, which are imposed on the edges between the nodes of the graph to represent the calculated relationship strengths as mentioned above. A first graph may be created first for a first type of nodes, in particular to cells, so that a node in the graph represents a cell in the network. A second graph may be created secondly for a second type of nodes, in particular for baseband units, so that a node in the graph represents a baseband unit in the network. On the first cell graph the extended iterative disjoint community detection algorithm is applied in order to cluster the cells in communities. This serves as an intermediate result which is forwarded as input to the next processing step, namely to apply the extended iterative disjoint community detection algorithm to the second baseband unit graph to cluster the baseband units in communities.

As a (final) result dataset a first dataset defining the cluster of cells and a second dataset defining the cluster of baseband units is provided. This result dataset is the basis for the network operator to design the network, and for example where to provide fibre optic cables for high performance and where to provide connections with lower transmission capabilities. The result dataset may be provided in several different formats: it may be provided graphically, with a representation of the network vertices and wherein the detected calculated communities are marked and labeled in different colors or markings. Another option is to provide the result dataset in a kind of textual string, comprising a representation of the detected and calculated communities, e.g. Corimnity A={Cell1, Cell 5, Cell 8}, Community B={Baseband Unit 3, Baseband Unit 5, Baseband Unit 7}.

The weight calculation process is an automatic computer based process for evaluating the connection strength between two or more network entities. According to a preferred embodiment it is based on equations (1), (2), (5) and (10), which will be described in more detail in the following detailed description. If Carrier Aggregation is used, different frequencies of the operator's network are utilized for transmission. The calculation of the relationship strengths (or weights respectively) are required to calculate a distance measurement. In addition, the optimal community structure ensures that the performance gains in terms of e.g. throughput and Carrier Aggregation utilization/availability (footprint) is maximized (under the imposed constraints).

In general, community detection algorithms can be categorized into disjoint algorithms and overlapping algorithms, based on whether the identified communities can overlap or not. Due to the technical requirements for cell and baseband unit communities for the purpose of a RAN design, the Applicant figured out that only disjoint community detection may be applied, which forbids vertices to belong to multiple communities, thus detecting non-overlapping communities. One popular and a widely used disjoint community detection algorithms is based on the random walk concept. For known disjoint community detection algorithms, it is referred to M. Rosvall, D. Axelsson, C. Bergstrom. "The map equation", 2009 and to P. Pons and M. Latapy. "Computing communities in large networks using random walks", Journal Graph Algorithms Appl., vol. 10, no. 2, 2006.

The term "an extended iterative disjoint community detection algorithm" refers to a disjoint community detection algorithm which is extended in order to enable consideration of network constraints. This may be done by applying weights on the edges, wherein the weight represents the calculated relationship strengths, which have been calculated according to the connection strength calculation process, mentioned above. The algorithm is an iterative algorithm. The algorithm stops when communities cannot be merged together anymore without violating the constraints (see FIG. 5 and corresponding description below). The optimal community structure satisfies all constraints and its communities were obtained by merging neighbour nodes and/or communities based on minimizing a "distance" measurement (indicating a very strong relationship). Particularly, the constraints for merging nodes are verified in each iteration. This, has the technical advantage that only those nodes are clustered together in one community, which satisfy the actual network requirements and characteristics. Only a particular selection of nodes, thus, will be clustered in one common community.

The constraints refer to technical requirements of the network, which are considered when providing the result dataset with the cluster of cells and baseband units. As an example, for a RAN design, in particular a Cloud-RAN design, the following constraints have to be considered:

Minimum/maximum number of cells per community (per baseband unit)

Minimum/maximum number of baseband units per community (per coordination cluster)

Baseband capacity limitations, i.e. that the members of a communities (here: cells grouped into baseband units) must fulfil a limit on inter alia:

Number of connected users

Number of Voice over Internet Protocol (VoIP) users

Scheduling entities

Signalling messages.

Figure 10:
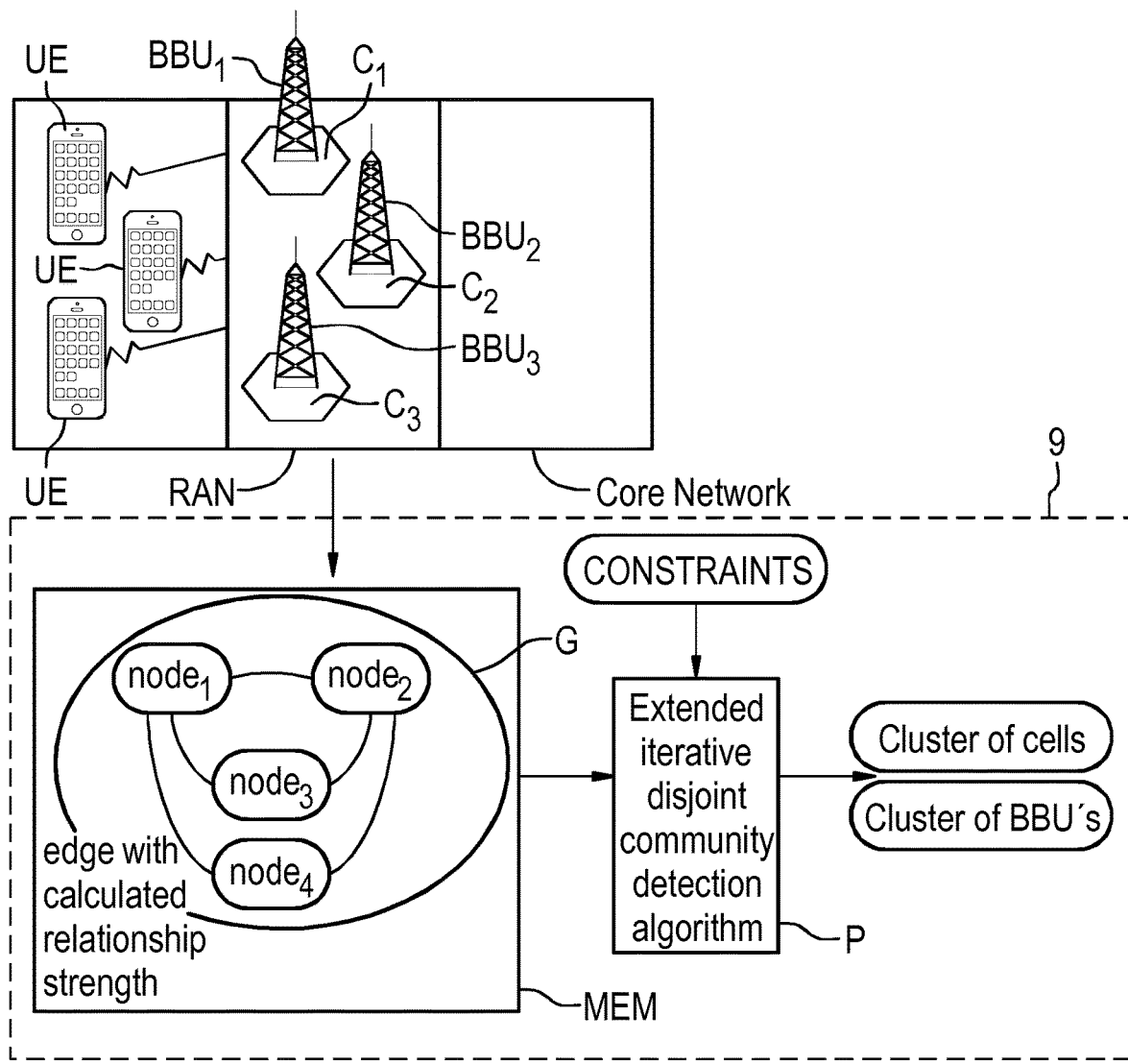

The overall structure of the invention is explained in more detail below with respect to FIG. 10. As depicted schematically in FIG. 10, a user equipment UE interacts with a RAN, including cells C and baseband units BBU to get access to the core network, which is depicted to the right in FIG. 10. The RAN in the example of Fig. comprises cells $C_1$, $C_2$, $C_3$ and respective baseband units $BBU_1$, $BBU_2$, $BBU_3$.

This network is transferred in a graph G, where a node may represent a cell C or a baseband unit BBU. The edges between the nodes ($node_1$, $node_2$, $node_3$ and $node_4$ in FIG. 10) in the graph are imposed with weights, which are calculated according to the connection strength calculation process. The graph G is stored in a memory MEM. A processor P is provided for executing the extended iterative disjoint community detection algorithm. This includes in each iteration step to check, whether all constraints—which may be pre-defined—for merging the respective nodes into communities are fulfilled. The constraints are detected dynamically. This has the advantage that new constraints may be considered as early as possible and automatically. After having completed the algorithm, a result data set is provided consisting of a first dataset with a cluster of cells C and a second dataset with a cluster of baseband units BBU. The memory MEM and the processor P may be implemented on a configuration apparatus 9, which may be implemented on a digital unit for coordination and design of the RAN.

FIG. 1 shows a flow chart of the method. After START, in step S11 relationship strengths 31, 41 for network connections between the vertices C, BBU are calculated by executing a connection strength calculation process. This may be done by analyzing performance factors, which have been judged to be decisive (in a prior evaluation phase) for network performance including cell coverage overlap, signal strength, and inter-cell interference. In step S12 a network graph is automatically created with nodes, representing the vertices C, BBU in the access network and edges, representing the network connections based on the calculated relationship strengths 31, 41. In step S13 the extended iterative disjoint community detection algorithm for clustering nodes (representing the vertices C, BBU) into communities is applied. In step S14 imposed constraints for merging cooperating nodes into the same community are analyzed. As can be seen in FIG. 1, steps S13 and S14 are preferably implemented as iteration. After having calculated all communities, the method ends or may be applied anew. In another preferred embodiment, the method may further comprise another step for providing defined or pre-defined constraints (not shown in FIG. 1). This step may be executed any time before applying the algorithm in steps 13 and 14.

Figure 2:
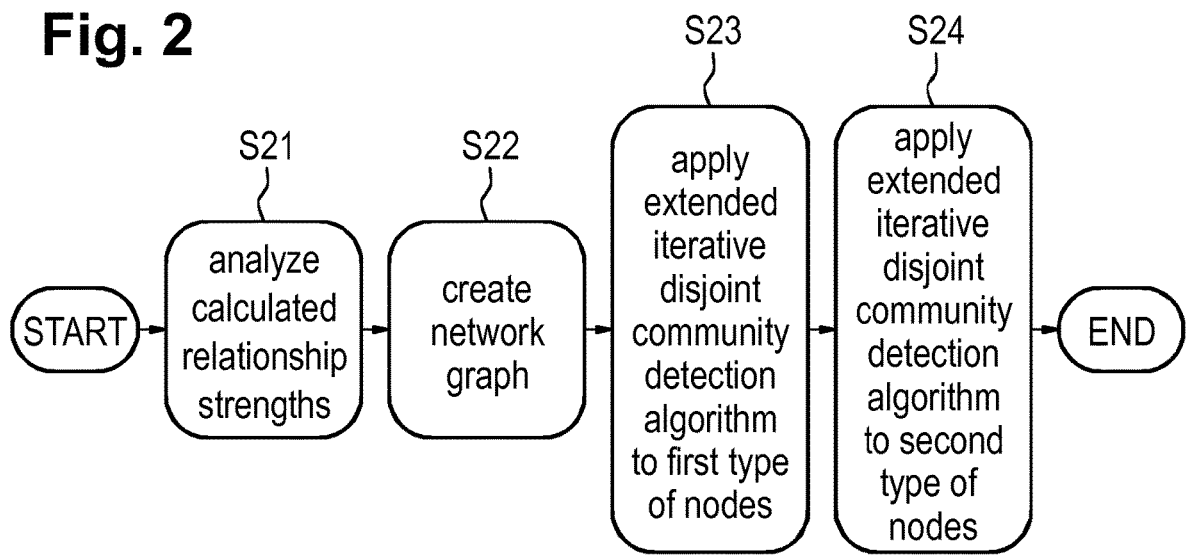
FIG. 2 is a flow chart of another example for the method for detecting communities in a mobile telecom network according to an embodiment of the invention.

FIG. 2 shows another preferred embodiment of the method, mentioned above. After START, in step S21 the relationship strengths are analyzed automatically in order to provide weights for graph creation. In step S22 the network graph is created so that in step S23 the extended iterative disjoint community detection algorithm is firstly applied to the first type of node, representing cells C of the network to provide an intermediate result with communities of cells. In step S24 this intermediate result serves as input for secondly applying the extended iterative disjoint community detection algorithm to the second type of nodes, representing baseband units BBU. After this the result dataset is provided on a user interface.

Figure 3A:
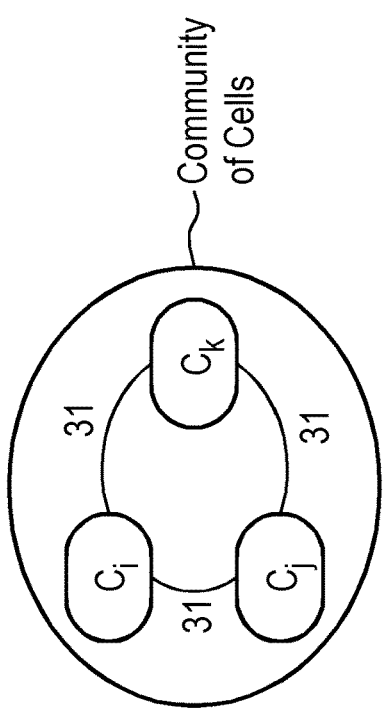
FIG. 3A schematically illustrates the clustering of cells in a community of cells and FIG. 3B schematically illustrates the creation of a network graph for the cells depicted in FIG. 3A, based on calculated relationship strengths.

FIG. 3A shows a schematic figure representing the group or community building of cells C. The connections between the cells C represent different factors, like signal quality, signal strength between the cells C. These factors are calculated by means of the connection strength calculation process. The calculated relationship strengths are depicted in FIG. 3A with reference numeral 31.

As already described above, with reference to FIG. 2, there are two fundamental parts of the Cloud-RAN design process: first the clustering of cells C into baseband units BBU and secondly the clustering of the baseband units BBU into RAN coordination clusters. For both, the proposed extended community detection solution can be used to solve this highly complex task.

Figure 3B:
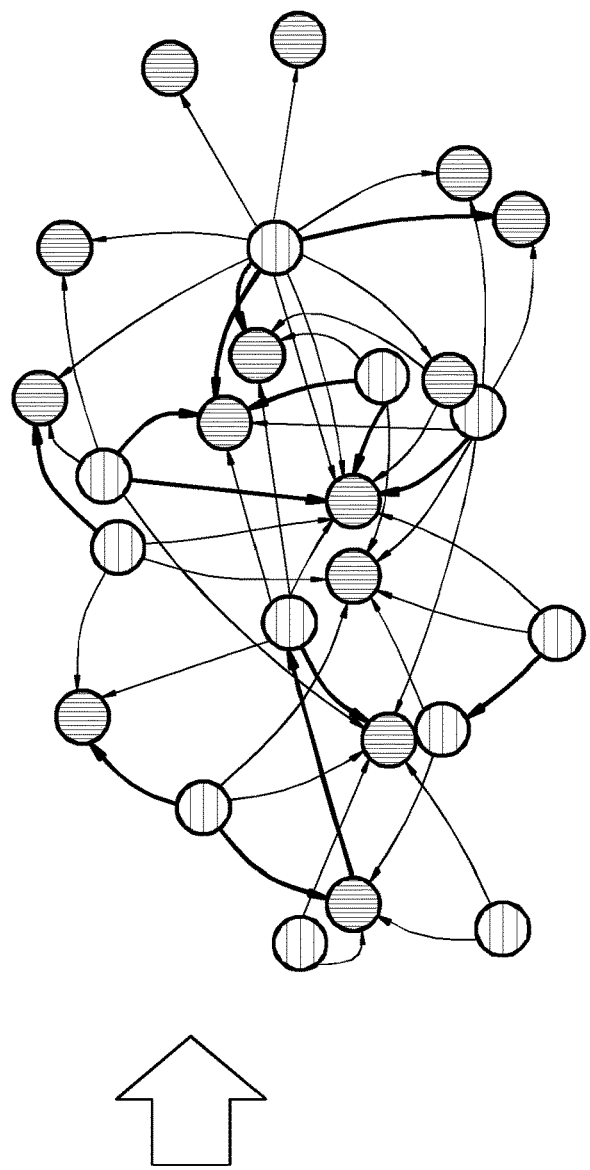
Figure 3B:

Before being able to apply community detection a network graph needs to be defined. For the RAN cell clustering design, the nodes of the graph represent the cells of the RAN in the mobile network, whereas the edges (connections between the cells) describe the relationship between these cells. This is illustrated in FIG. 3B, where—in the left side—Cell$_i$ is horizontally lined an cell$_j$ is vertically lined and the weight is represented with $W_{i,j}$. For each edge/connection a weight is defined to determine the strength of the relationship. The higher the weight, the stronger the relationship is between the corresponding vertices and hence the more likely it is that these vertices belong to the same community (or cluster). The created network graph is represented on the right side in FIG. 3B, where connection lines are represented as thin or thick, thus, for the sake of clarity only two different types of connections are shown in FIG. 3B on the right side.

One part of the proposed solution is the definition of the relationship weight for cells C or baseband units BBU. This is crucial as it impacts the community detection results and hence the overall design. In order to achieve an optimal design and hence optimal network performance, different performance factors are considered which are described in more detail in the following.

The inter-frequency cell coverage overlap between a cell i and a cell j of another frequency is defined as follows:

$$\theta_{Inter,i,j} = \frac{\sum s_{i,j}}{\sum_{n=1}^{N}\sum_{m=1}^{N}\sum s_{n,m}}, n \neq m, \quad (1)$$

The inter-frequency cell coverage overlap may be defined as the coverage overlap of cells, which send with different frequencies. This is of particular importance when applying Carrier Aggregation. For example, if a user equipment is located in a cell which is operated with frequency band B1 and if there exists an overlap with another cell which is operated with frequency band B2, then it is possible to send data via both frequency bands B1 and B2.

In equation (1) $s_{i,j}$ corresponds to one data point sample for which cell i is the best server and cell j a monitored inter-frequency neighbor. Furthermore, for the data point sample to be considered in (1), the signal-interference-plus-noise ratio (SINR) as well as the Reference Signal Received Power (RSRP) of the monitored inter-frequency neighbor cell j have to be above a certain threshold. This way, one can ensure that Carrier Aggregation is configured (RSRP>thresholdRSRP) and activated (SINR>thresholdSINR). Clearly, $\theta_{Inter,i,j}$ corresponds to the absolute inter-frequency cell coverage overlap since the sum of all relevant data points for cell i and j is divided by the sum of all data points for all possible cell combinations (please note that N in (1) is the overall number of cells).

The average inter-frequency secondary cell signal quality between a cell i and a cell j of another frequency is defined as follows:

$$\mu_{i,j} = \frac{1}{K}\sum_{k=1}^{K}\gamma_{k,i,j} \quad (2)$$

In equation (2) K corresponds to all relevant data point samples for which cell i is the best server and cell j a monitored inter-frequency neighbor as explained above for equation (1). Furthermore, $\gamma_{k,i,j}$ corresponds to the geometry (or estimated SINR) of the inter-frequency cell j for the data point sample k.

The intra-frequency cell coverage overlap between a cell i and a cell j of the same frequency is defined as follows:

$$\theta_{Intra,i,j} = \frac{\sum s_{i,j}}{\sum\limits_{m=1}^{N}\sum s_{n,m}}, m \neq i, \quad (3)$$

The intra-frequency cell coverage overlap may be defined as the coverage overlap of cells, which send with the same frequency. This is of particular interest when applying intra-frequency CoMP procedures.

In equation (3) $s_{i,j}$ corresponds to one data point sample for which cell i is the best server and cell j a monitored intra-frequency neighbor. Furthermore, for the data point sample to be considered in (3), the delta between the RSRP of cell i and RSRP of cell j has to be smaller than a certain threshold. This ensures that the neighbor signal is strong enough to be relevant for CoMP features. Clearly, $\theta_{Inter,i,j}$ corresponds to the relative intra-frequency cell coverage overlap since the sum of all relevant data points for cell i and j is divided by the sum of all data points for all possible cell combinations for which cell i is the best server (please note that N in (3) is the overall number of cells).

The average intra-frequency delta RSRP between a cell i and a cell j of the same frequency is defined as follows:

$$\sigma_{i,j} = \frac{1}{K}\sum_{k=1}^{K}\delta_{k,i,j} \quad (4)$$

In equation (4) K corresponds to all relevant data point samples for which cell i is the best server and cell j a monitored intra-frequency neighbor as explained above for equation (3). Furthermore, $\delta_{k,i,j}$ corresponds to the delta RSRP between cell i and j for the data point sample k.

Based on the above described indicators, the relationship weight/connection strength between a cell i and cell j is described as follows:

$$W_{i,j} = (\theta_{Inter,i,j}\|*\|\mu_{i,j}\| + \|\theta_{Intra,i,j}\|*\|\sigma_{i,j}\|)*(1-\|d_{i,j}\|) \quad (5)$$

In equation (5) $\|\bullet\|$ corresponds the normalized value over the calculated values of all possible cell combinations. Moreover, $d_{i,j}$ is the distance between cell i and cell j. As it can be seen, the relationship weight in (5) considers all important factors for an optimal network performance such as Carrier Aggregation cell coverage overlap and signal quality as well as the cell coverage overlap and signal strength (diversity gain) for CoMP features. Further factors may be added.

Based on (5) a network graph G can be created for the cell clustering design and an extended disjoint community detection algorithm can find the optimal communities, i.e. communities (here corresponding to group of cells) which have a strong relationship among themselves but only have a sparse connection with respect to other communities.

Contrary to state of the art disjoint community detection algorithms, the proposed method can detect communities considering pre-defined constraints. The existing disjoint community detection algorithms can be enhanced with the proposed method which make them applicable to many real-world applications.

Figure 5:
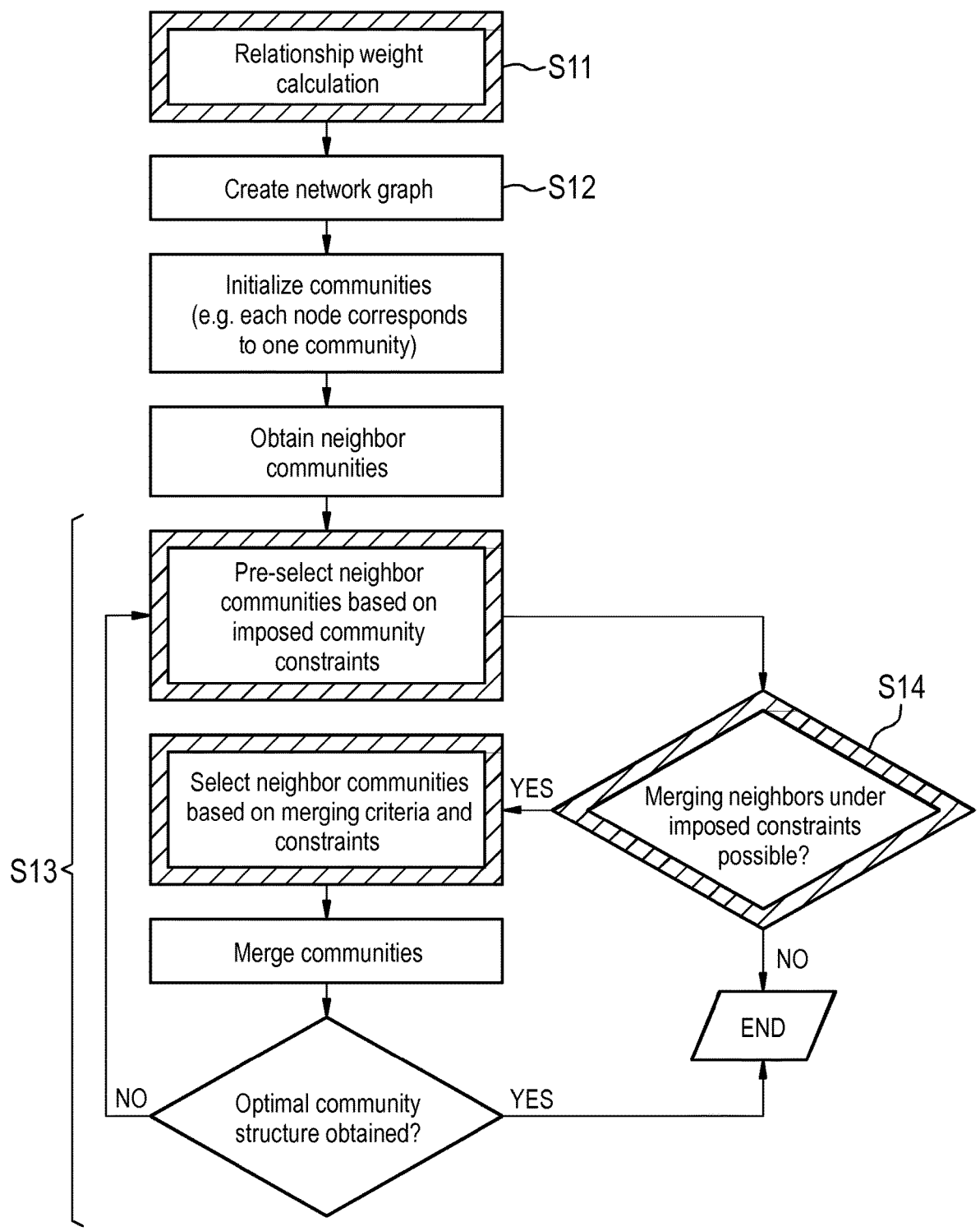
FIG. 5 is a flow chart of a method for detecting communities by using an extended iterative disjoint community detection algorithm and by imposing constraints for clustering nodes into communities.

FIG. 5 depicts the general flow of the new proposed method. The elements in the flow chart, depicted in FIG. 5 which show a lined border (for example: "pre-select neighbor communities . . . ", "select neighbor communities . . . ") refer to new elements and to the extension of prior art algorithms. The elements without any borders or shading are also used in state of the art methods. First, relationship weights have to be calculated according to equations (1)-(5) and (10) for the cell clustering and baseband unit clustering, respectively. Based on the relationship weights a network graph G can be created and the extended community detection algorithm can be executed. In this regard, disjoint community detection algorithms are iterative algorithms which merge closely related nodes into the same community in each iteration step until the optimal community structure has been found. The algorithm ends, when no more communities or nodes may be grouped together for which the constraints can still be fulfilled. How to select communities or nodes to be merged plays a central role in the different community detection algorithms. The proposed method enhances this selection by taking community constraints into account. In particular, the method introduces two different types of constraints:

Hard requirements (constraints which need to be fulfilled), such as
  Maximum number of cells per community (per baseband unit)
  Maximum number of baseband units per community (per coordination cluster)
  Baseband capacity limitations:
    Number of connected users,
    Number of VoIP users,
    Scheduling entities, and
    Signaling messages Soft requirements (targeted constraints, however not necessarily to be fulfilled), such as
  Minimum number of cells per community (per baseband unit)
  Minimum number of baseband units per community (per coordination cluster)

Please note that the proposed method is not restricted to the above constraint examples and additional constraints can be easily added and used in the same manner. In the following, the detailed explanation of the proposed method will focus on the above examples.

During each iteration of the extended disjoint community detection algorithm, the current communities are analyzed in the new "Pre-select neighbor communities based on imposed community constraints" process. In case of cell clustering, the following attributes are calculated for each community i:

Current number of community members (number of cells): $M_i$

Sum of forecasted connected users per community member (per cell):

$$CU_i = \sum_{m=1}^{M_i} cu_m$$

Sum of forecasted VoIP users per community member (per cell):

$$VOIP_i = \sum_{m=1}^{M_i} voip_m$$

Sum of forecasted scheduling entities per community member (per cell):

$$SE_i = \sum_{m=1}^{M_i} se_m$$

Sum of forecasted signaling messages per community member (per cell):

$$SM_i = \sum_{m=1}^{M_i} sm_m$$

In case of baseband unit clustering, the following attributes are calculated for each community i:
Current number of community members (number of baseband units): B_i Based on the above attributes of each community, neighbor communities are evaluated. Neighbor communities are communities which have a connection/relationship between each other. In this regard, for each neighbor community pair consisting of community i and community j the following constraints are checked:
For Cell Clustering
$M_i+M_j \le$ Maximum number of cells per baseband unit
(hard requirement)
$M_i+M_j \ge$ Minimum number of cells per baseband unit
(soft requirement)
$CU_i+CU_j \le$ Maximum number of connected users per baseband unit
(hard requirement)
$VOIP_i+VOIP_j \le$ Maximum number of VOIP users per baseband unit
(hard requirement)
$SE_i+SE_j \le$ Maximum number of scheduling entities per baseband unit
(hard requirement)
$SM_i+SM_j \le$ Maximum number of scheduling messages per baseband unit
(hard requirement)
For baseband unit clustering
$B_i+B_j \le$ Maximum number of baseband unit per coordination cluster
(hard requirement)
$B_i+B_j \ge$ Minimum number of baseband unit per coordination cluster
(soft requirement)

The proposed method creates a list of neighbor community pairs which can fulfill all "hard" constraints. The entries of this list are further prioritized based on the "soft" constraints, i.e. a neighbor community pair which does not fulfill the soft constraints is assigned a higher weight, hence has a higher chance to be selected for merging. The weights are determined according to equation (6) or (7), depending whether cell clustering or baseband unit clustering is executed.

$$\beta_{M,i,j} = \max(\text{Min}_M - (M_i+M_j-1),1) \quad (6)$$

$$\beta_{B,i,j} = \max(\text{Min}_B - (B_i+B_j-1),1) \quad (7)$$

Figure 6:
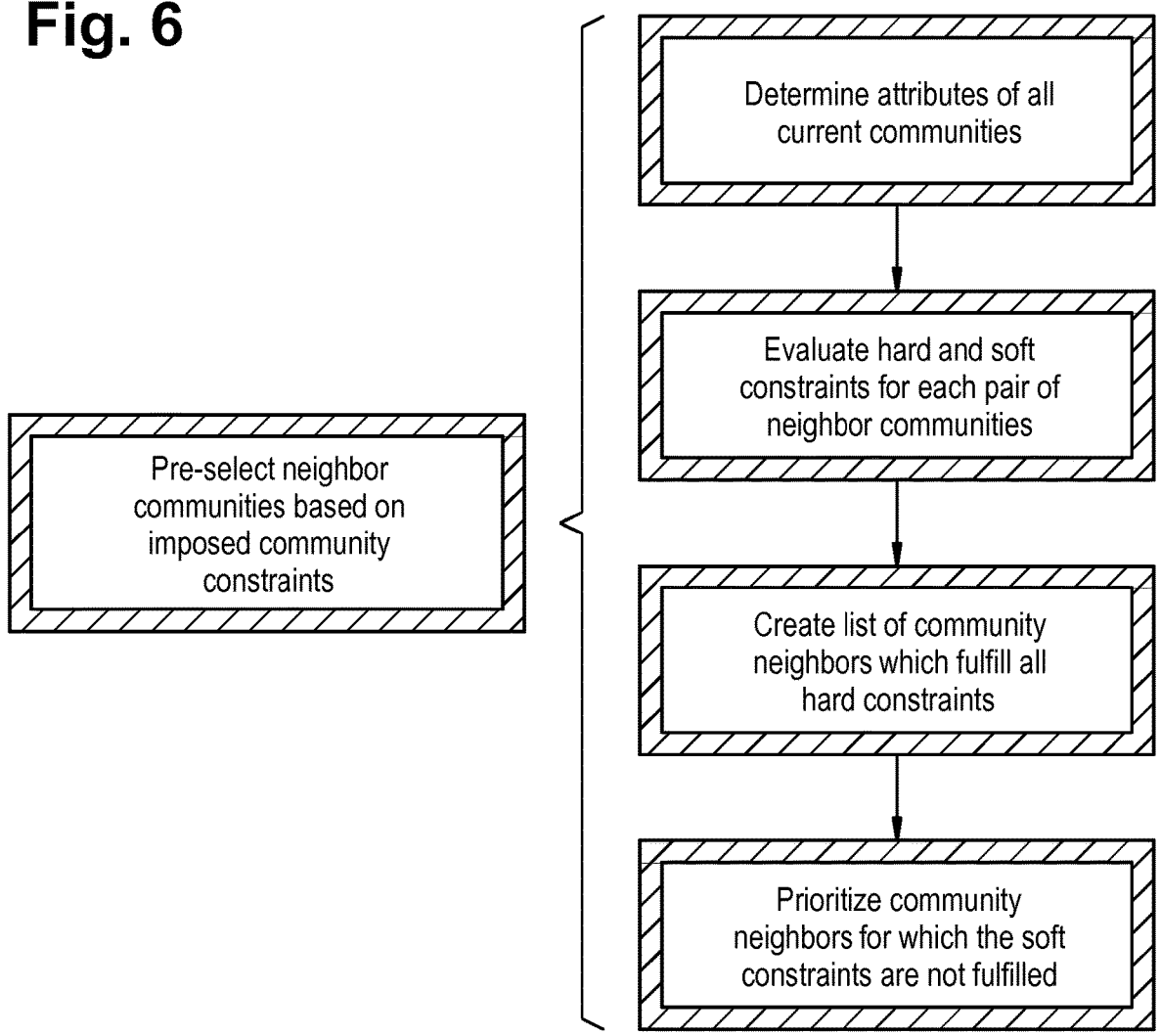
FIG. 6 is a more detailed flow chart of a neighbour pre-selection process according to a preferred embodiment of the present invention.

In this regard, $\text{Min}_M$ corresponds to the minimum cells per baseband unit and $\text{Min}_B$ to the minimum number of baseband units per coordination cluster. A summary of the new "Pre-select neighbor communities based on imposed community constraints" process is illustrated in FIG. 6. In FIG. 6 again, all elements, depicted with lined borders refer to new elements, which are not present in known disjoint community detection algorithms.

Furthermore, in each iteration step one neighbor community pair must be selected out of the list of pre-selected neighbor community pairs (as defined above) to be merged together into one single community. For this decision, various state-of-the-art measurements exist. For example, a measurement of the structural similarity between vertices and between communities could be used which is related to a "distance" measurement $r_{i,j}$. A neighbor community pair which minimizes the "distance" measurement (indicating a very strong relationship) is usually selected. In this regard, the proposed solution enhances further existing disjoint community detection algorithms by including the weighting for the "soft" constraints. Hence, the neighbor community pair i,j which maximizes the following expression is selected to be merged together:

Cell clustering $$\max_{i,j}\left(\frac{\beta_{M,i,j}}{r_{i,j}}\right) \quad (8)$$

baseband unit clustering $$\max_{i,j}\left(\frac{\beta_{B,i,j}}{r_{i,j}}\right) \quad (9)$$

Here the expression in (8) is used for cell clustering, whereas (9) is used when baseband unit clustering is executed.

As it can be seen in FIG. 5, during each iteration step it is verified if there are still neighbor community pairs which can fulfill all the "hard" constraints. If this is not the case, then the community detection process is completed and the optimal community structure subject to the imposed constraints is found.

As mentioned earlier, the RAN design process consists of two fundamental parts: clustering of cells C into baseband units BBU and clustering of the baseband units BBU into RAN coordination clusters. Clearly, the output of the cell clustering is the input for the baseband unit clustering. The cell clustering output defines the optimal community structure where each community corresponds to a group of cells to be connected to one baseband unit.

Figure 4A:
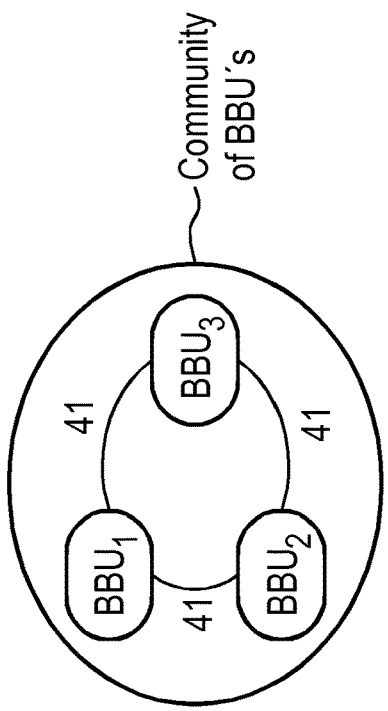
FIG. 4A schematically illustrates the clustering of baseband units in a community of baseband units and FIG. 4B schematically illustrates the creation of a network graph for the baseband units depicted in FIG. 4A, with a transformation of cell relationships into baseband unit relationships.

FIG. 4A shows the clustering of baseband units $BBU_1$, $BBU_2$, $BBU_3$ in a baseband unit community. The connections refer to calculated relationship strengths 41 for network connections between the baseband units BBU. The relationship strengths 41 are calculated by executing a connection strength calculation process.

Figure 4B:
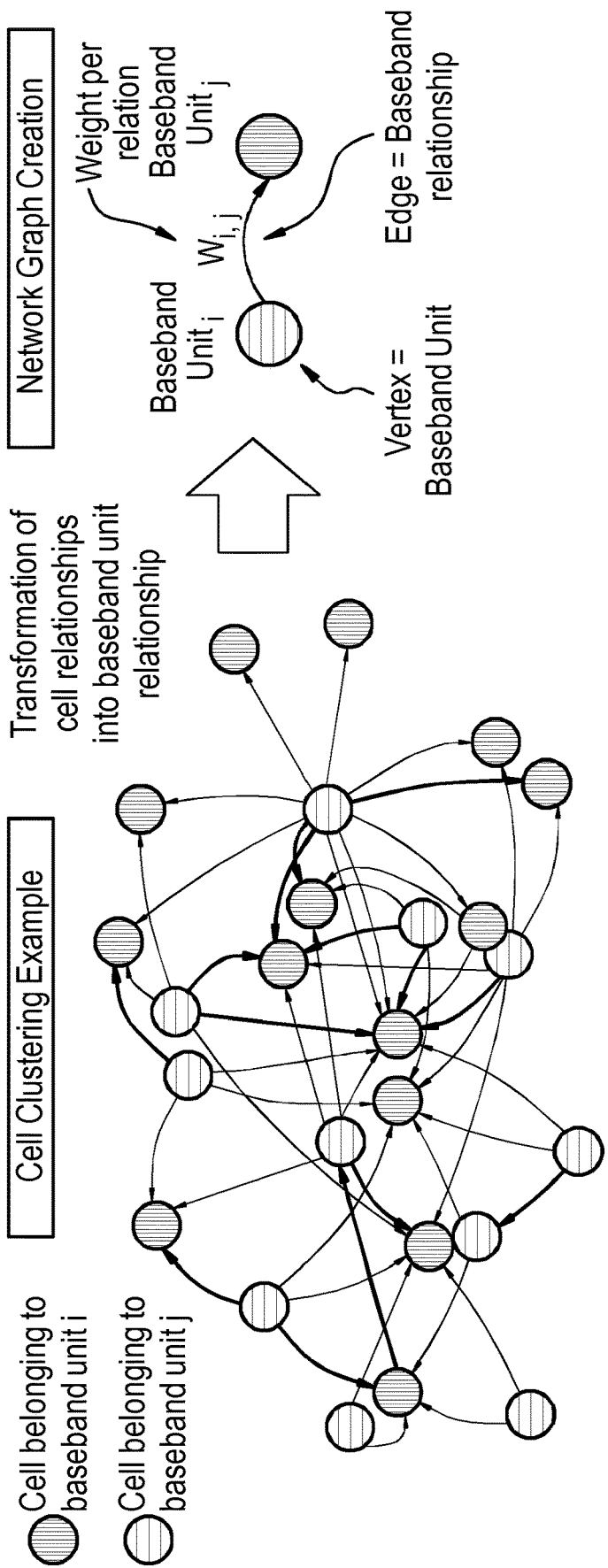

Again, a network graph G needs to be defined for carrying out community detection for the baseband units BBU to obtain the optimal RAN coordination clusters. In this regard, the nodes of the network graph represent baseband units BBU of a mobile network, whereas edges (connections between the baseband units) describe the relationship between them. As illustrated in FIG. 4B, for each edge/connection a weight is defined to determine the strength of the baseband unit relationship, which is represented in FIG. 4B with reference numeral $W_{i,j}$ between baseband unit i and baseband unit j. The higher the weight, the stronger the relationship is between the corresponding vertices and hence the more likely it is that these vertices belong to the same community (or cluster). The cells belonging to different baseband units are represented in FIG. 4B on the left side with different markings.

Let us define a set of cell pairs belonging to baseband units i and j as $S_{ij}=\{m_1 \ n_1 \ldots m_{|s|} \ n_{|s|}\}$, where $|S_{ij}|$ is the size of the set, $m_k$ is a cell belonging to a baseband unit i, $n_k$ is a cell belonging to a baseband unit j, and where the cell pair $m_k \ n_k$ has an inter-frequency relationship (inter-frequency cell coverage). Then the relationship weight/strength between a baseband unit i and a baseband unit j is described as follows in Equation 10:

$$W_{i,j} = |S_{i,j}| * \left\| \sum_{k=1}^{|S_{ij}|} \theta_{Inter,m_k,n_k} \right\| * \left\| \sum_{k=1}^{|S_{ij}|} \mu_{m_k,n_k} \right\| * \left( 1 - \left\| \frac{1}{|S_{ij}|} \sum_{k=1}^{|S_{ij}|} d_{m_k n_k} \right\| \right) \quad (10)$$

In (10) θ and p correspond to the inter-frequency cell coverage overlap and inter-frequency secondary cell signal quality, respectively, as defined in (1) and (2). The distance between cell $m_k$ and $n_k$ is indicated as $d_{m_k,n_k}$ and $|S_{ij}|$ is the size of the cell pair set corresponding to the total number of inter-frequency cell relationships between baseband unit i and j. Furthermore, $\|\cdot\|$ corresponds the normalized value over all possible cell combinations $|S_{ij}|$. As it can be seen from (10), the relationship weight considers all important factors for achieving an optimal Carrier Aggregation network performance. Please note, that additional factors for inter-BBU CoMP features could be considered in (10) in the future, however where omitted because currently there are no inter-BBU CoMP software features.

The relationship weight definition in (10) is required to create a network graph G and perform the baseband unit clustering design. Community detection for baseband units can be carried out with the corresponding constraints as described earlier.

According to an example for RAN cell clustering design the following constraints may be considered:
  Number of cells C per community (per baseband unit BBU) must be equal or below 15;
  Minimum number of cells C per community (per baseband unit BBU) should be equal or above 6;
  All baseband capacity limitations must be fulfilled.

Figure 7:
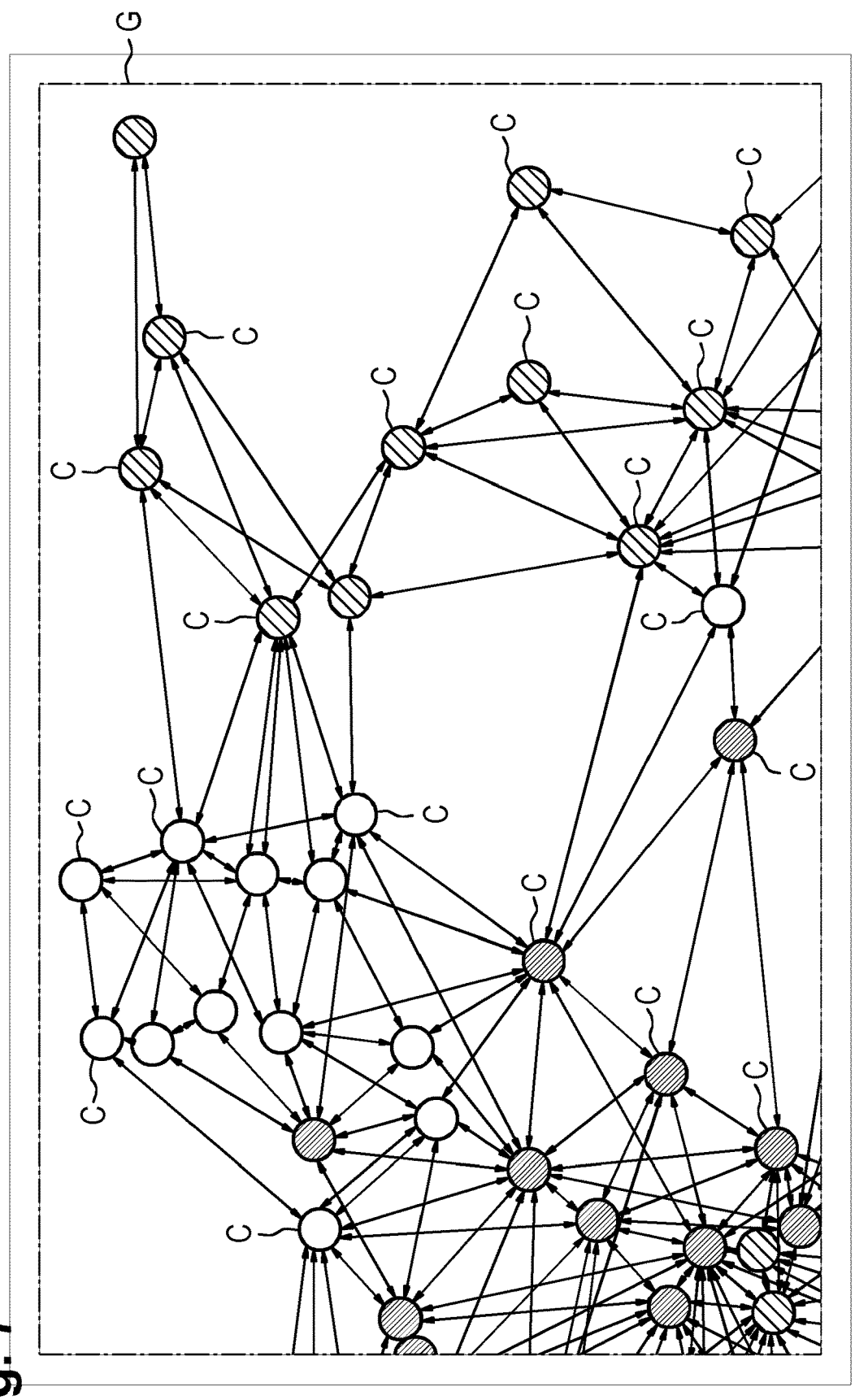
FIG. 7 schematically shows a part and section of a cell clustering result dataset, for which several constraints have been considered by way of example.

FIG. 7 shows a section or a part of the cell clustering result with the proposed solution by means of applying the extended iterative disjoint community detection algorithm in a schematic manner. In FIG. 7 the nodes in the graph G represent cells C. The detected communities are represented in the figures by nodes with corresponding linings. I.e. nodes which are marked with diagonal lining belong to a first detected community, whereas nodes which are not lined at all belong to a second detected community and so on. The communities have been detected by applying the extended iterative disjoint community detection algorithm and, thus all detected communities fulfill the imposed hard as well as soft constraints. This is also confirmed by experiments, which will be shown with respect to FIG. 8A and FIG. 8B.

Figure 8A:
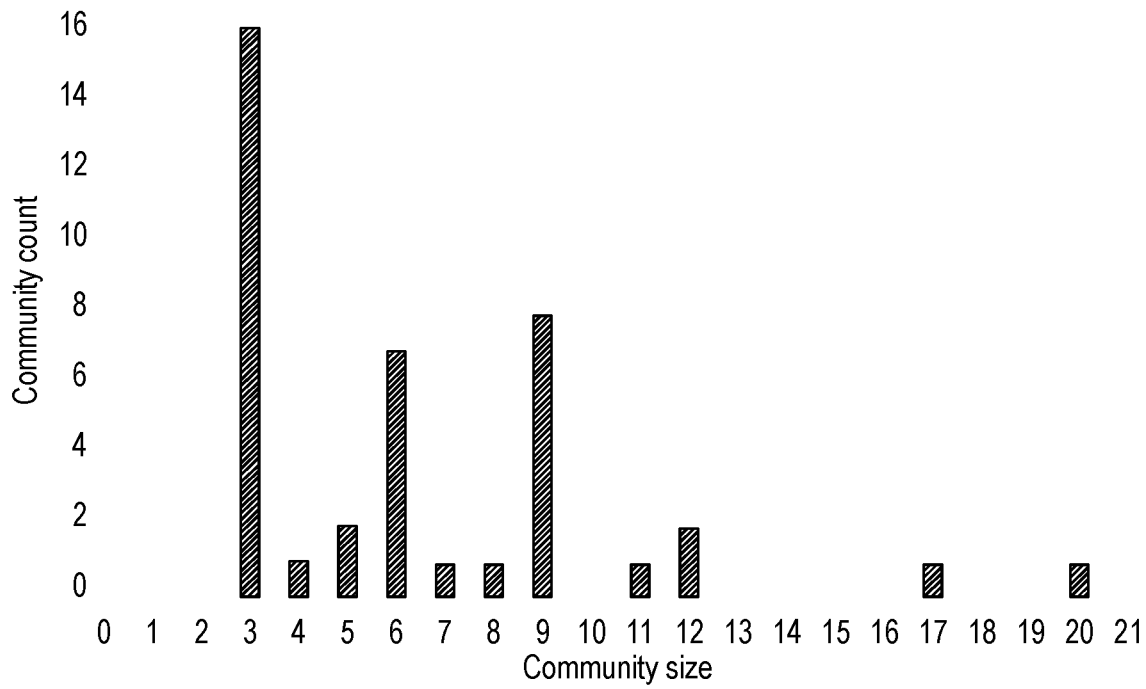
FIG. 8A schematically illustrates community size distribution with state of the art disjoint community detection algorithms and FIG. 8B schematically illustrates community size distribution according to the extended iterative disjoint community detection algorithm of the invention and FIG. 9 shows a structural block diagram for a coordination apparatus according to a preferred embodiment of the present invention and FIG. 10 shows a schematic overview of a system for detecting communities in a mobile telecom network and FIG. 11A and FIG. 11B show a comparison of performance figures for prior art systems and the system according to the invention, based on the extended iterative disjoint community detection algorithm.
Figure 8B:
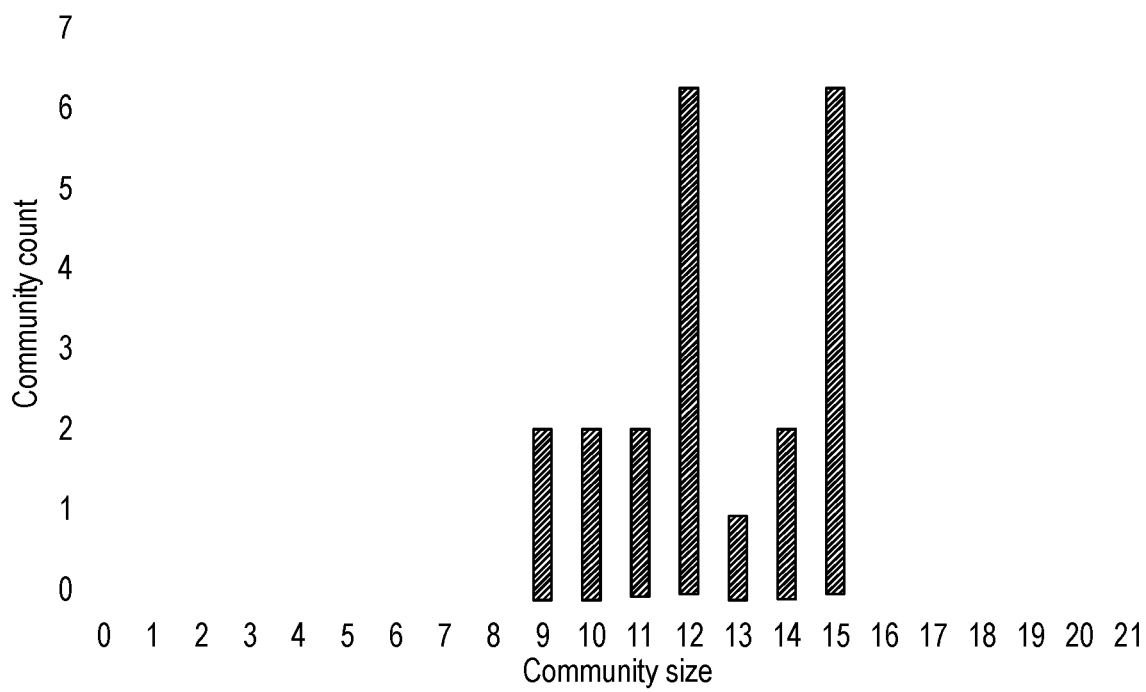

FIG. 8A shows the distribution of the community size of the detected communities according to know prior art methods. Here, most communities do not fulfill the required constraints. As can be seen in FIG. 8A a high variation of community size with many small communities is the result. In contrast to this, in FIG. 8B the community size is much more uniform according to the proposed solution by applying the extended iterative disjoint community detection algorithm The community size is equal or less than 15 cells C for all communities and in addition the soft constraint of 6 cells C per community (per baseband unit BBU) is also fulfilled.

Moreover, the result data indicate that no community exceeds the imposed baseband unit capacity constraints with the proposed solution. Contrary to state-of-the-art disjoint community detection algorithms (e.g. Walktrap, InfoMap, Edge Betweeness) no constraints can be imposed on the detected communities. Clearly, the number of cells C per baseband unit BBU cannot be controlled and is varying significantly among all communities. Many detected communities in prior art detection algorithms do not fulfill the hard as well as soft constraints. Thus, state-of-the-art disjoint community detection algorithms cannot solve many real-world problems, in particular for the design and optimization of mobile networks.

Figure 9:
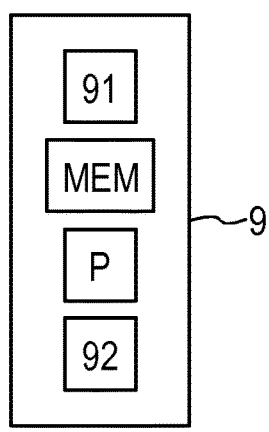

FIG. 9 is a block diagram, representing a coordination apparatus 9 with its subunits. In a preferred embodiment, the coordination apparatus 9 may comprise a strength calculator 91, which is adapted to execute the connection strength calculation process for analyzing performance factors. The coordination apparatus 9 further comprises a memory MEM for storing the created graph G. Of course, it is also possible to store the result with the final dataset and the automatically detected communities in the memory MEM, too. The coordination apparatus 9 comprises a processor P, which is adapted for executing the extended iterative disjoint community detection algorithm with processing the imposed constraints in each iteration step. Finally, the coordination apparatus 9 may comprise an output interface for providing the result dataset in a graphical or textual format.

The coordination apparatus 9 usually will also consist of an input interface (not shown in FIG. 9) for receiving relevant network data of the RAN and the constraints. Additional units may be provided for improved processing.

The units of the coordination apparatus 9 may also be distributed over several instances of the coordination apparatus 9. Further, they may be provided in a virtualized form.

In another embodiment, it is also possible to aggregate and assemble the strength calculator 91 and the processor P in one common unit, inter alia to incorporate the strength calculator 91 into the processor P.

Further embodiments of the coordination apparatus 9 relate to embodiments which have been described above with respect to the method. The processor P may, for example, be adapted to execute the extended iterative disjoint community detection algorithm sequentially, first for first type nodes, like cells C and then for second type nodes, like baseband units BBU.

Moreover, the processor P may, for example, be adapted to calculate the constraints for merging cooperating cells C as first type node in one baseband unit BBU, which serves as community. The constraints may be provided in a predefined manner and refer to capacity requirements of the respective baseband unit BBU and may comprise: a maximum and minimum number of cells C per baseband unit BBU, a maximum number of connected users per baseband unit BBU, a maximum number of VoIP users per baseband unit BBU, a maximum number of scheduling entities and scheduling messages per baseband unit BBU.

In another embodiment, the processor P may calculate the constraints for merging cooperating baseband units BBU as second type node in one community. The constraints may be pre-defined and may refer to capacity requirements of the respective community and may comprise: a maximum and minimum number of baseband units BBU per community.

In another embodiment, the strength calculator 91 or the processor P may be adapted to execute the connection strength calculation process. The latter may consider radio access network performance measures.

The connection strength calculation process may be executed by the strength calculator 91 or the processor P in the manner described above. For example, the connection strength calculation process for detecting baseband communities may be based on analysing a set of performance factors for achieving an optimal carrier aggregation network performance, including inter-frequency cell coverage overlap and signal quality, number of inter-frequency cell relationships, and physical cell distance. Moreover, the connection strength calculation process for detecting cell communities is based on analysing a set of performance factors for achieving an optimal radio access network performance with respect to coordinated multipoint and carrier aggregation techniques, comprising intra- and inter-frequency cell coverage overlap, signal strength and quality, as well as physical cell distance.

Figure 11A:
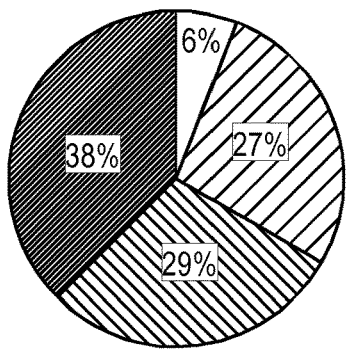
Figure 11A:
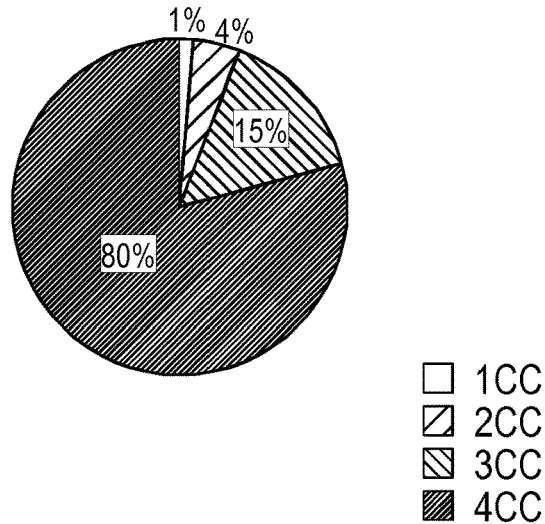
Figure 11B:
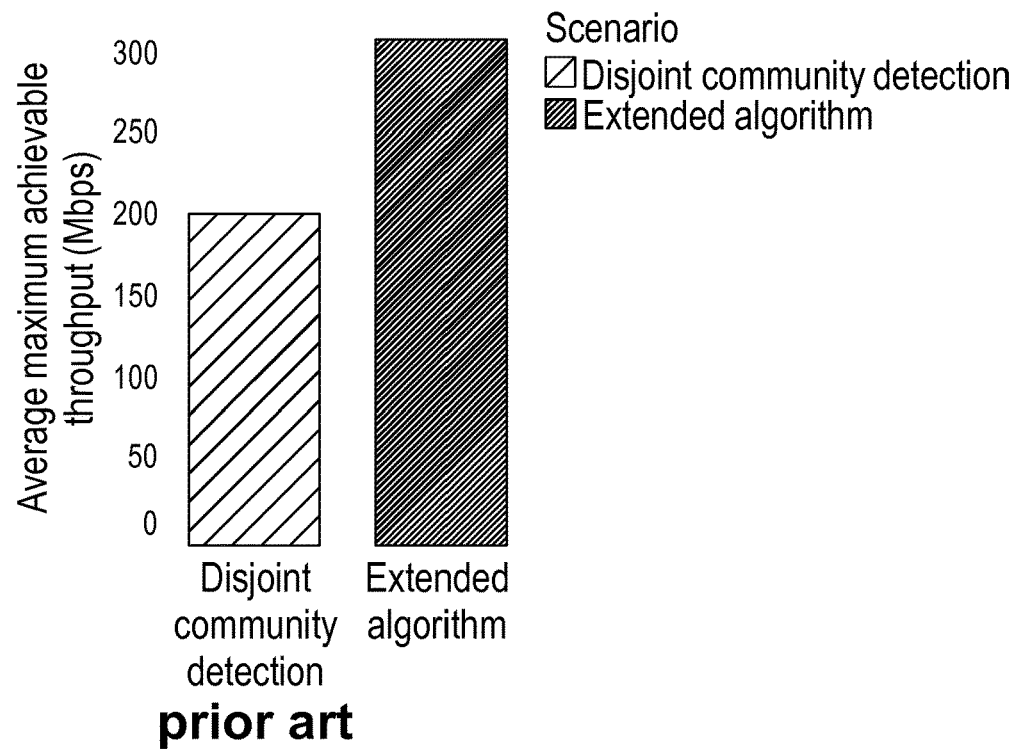

FIG. 11A and FIG. 11B show examples for network performance results after designing a network with a state-of-the-art disjoint community detection algorithm and the proposed solution with execution of the extended iterative disjoint community detection algorithm (in the figures abbreviated as: "extended algorithm"). The latter one, allows to obtain a more equally distribution of cells C per BBUs and BBUs per RAN cluster by introducing constraints. This also leads to an increased network performance. In FIG. 11A, the Carrier Aggregation footprint is illustrated, i.e. the probabilities of using a single component carrier (corresponds to the no Carrier Aggregation case), as well as two, three, or four component carriers for data transmission. With the proposed algorithm data transmission with different carrier frequencies can be significantly increased, and hence the data throughput can be improved which is shown in FIG. 11B.

While the current invention has been described in relation to its preferred embodiments, it is to be understood that this description is for illustrative purposes only. The coordination apparatus 9 and the processor P may be included in cloud computing environments or may be provided virtually. Accordingly, it is intended that the invention be limited only by the scope of the claims appended hereto.

The invention claimed is:

1. A method for detecting communities in a radio access network of a mobile telecom network with a plurality of vertices, the method comprising:
calculating relationship strengths for network connections between the plurality of vertices by executing a connection strength calculation process by analyzing performance factors decisive for radio access network performance, wherein each vertex in the plurality of vertices represents an entity in a radio access network (RAN);
creating a network graph, with nodes representing the vertices in the radio access network, and edges representing the network connections, based on the calculated relationship strengths;
applying an extended iterative disjoint community detection algorithm for clustering nodes into communities, wherein in each iteration imposed, one or more different constraints for clustering nodes into the same community are analyzed;
wherein the nodes are at least of a first type and a second type;
wherein a node of the second type comprises or is connectable to multiple nodes of the first type, and wherein a node of the first type does not belong to multiple nodes of the second type;
wherein the extended iterative disjoint community detection algorithm is firstly applied to nodes of the first type to provide an intermediate result with communities of nodes of the first type; and
wherein the intermediate result serves as input for secondly applying the extended iterative disjoint community detection algorithm to the nodes of the second type; and
clustering the nodes of the first and second type for which the constraints are fulfilled into communities of a first and second type, respectively.

2. The method of claim 1, wherein the performance factors comprise: cell coverage overlap, signal strength, and/or inter-cell interference.

3. The method of claim 1, further comprising providing the one or more constraints for clustering nodes into the same community.

4. The method of claim 1, wherein the connection strength calculation process considers radio access network performance measures.

5. The method of claim 1, wherein a connection strength calculation process for detecting baseband communities is based on analyzing a set of performance factors for achieving an optimal carrier aggregation network performance, the set comprising inter-frequency cell coverage overlap and signal quality, number of inter-frequency cell relationships, and/or physical cell distance.

6. The method of claim 5, wherein detected baseband unit communities are used for coordination of the plurality of baseband units in order to improve radio access network performance by means of carrier aggregation and in order to mitigate inter-cell interference by applying uplink and/or down-link Coordinated Multi-Point features.

7. The method of claim 1, wherein a connection strength calculation process for detecting cell communities is based on analyzing a set of performance factors for achieving an optimal radio access network performance with respect to coordinated multipoint and carrier aggregation techniques, the set comprising intra- and inter-frequency cell coverage overlap, signal strength and quality, and/or physical cell distance.

8. The method of claim 1, wherein the one or more constraints for clustering cells as first type nodes in one baseband unit as a second type node, which serves as community, are provided and refer to capacity requirements of the respective baseband unit and comprise: a maximum and/or minimum number of cells per baseband unit; a maximum number of connected users per baseband unit; a maximum number of VoIP users per baseband unit; and/or a maximum number of scheduling entities and/or scheduling messages per baseband unit.

9. The method of claim 1, wherein the one or more constraints for clustering cooperating baseband units as second type nodes in one community are provided and refer to capacity requirements of the respective community and comprise: a maximum and/or minimum number of baseband units per community.

10. The method of claim 1, wherein detected cell communities are used to define baseband units in such a way that the network performance is improved by means carrier aggregation and in order to mitigate inter-cell interference by applying uplink and/or downlink Coordinated Multi-Point features for those baseband units.

11. The method of claim 1 wherein each vertex in the plurality of vertices represents a cell or a baseband unit (BBU).

12. A coordination apparatus for detecting communities in a radio access network of a mobile telecom network with a plurality of vertices, the coordination apparatus comprising:
processing circuitry;
memory containing instructions executable by the processing circuitry whereby the apparatus is operative to:
calculate relationship strengths for network connections between the plurality of vertices by executing a connection strength calculation process by analyzing performance factors decisive for radio access network performance, wherein each vertex in the plurality of vertices represents an entity in a radio access network (RAN);
create a network graph, with nodes representing the vertices in the network, and edges representing the network connections, based on the calculated relationship strengths; and
apply an extended iterative disjoint community detection algorithm for clustering nodes into communities, wherein in each iteration imposed one or more different constraints for clustering cooperating nodes into the same community are analyzed;
wherein the nodes are at least of a first type and a second type;
wherein a node of the second type comprises or is connectable to multiple nodes of the first type, and wherein a node of the first type does not belong to multiple nodes of the second type;
wherein the extended iterative disjoint community detection algorithm is firstly applied to nodes of the first type to provide an intermediate result with communities of nodes of the first type; and
wherein the intermediate result serves as input for secondly applying the extended iterative disjoint community detection algorithm to the nodes of the second type; and
clustering the nodes of the first and second type for which the constraints are fulfilled into communities of a first and second type, respectively.

13. A non-transitory computer readable recording medium storing a computer program product for controlling a coordination apparatus for detecting communities in a radio access network of a mobile telecom network with a plurality of vertices, the computer program product comprising program instructions which, when run on processing circuitry of the coordination apparatus, causes the coordination apparatus to:
calculate relationship strengths for network connections between the plurality of vertices by executing a connection strength calculation process by analyzing performance factors decisive for radio access network performance, wherein each vertex in the plurality of vertices represents an entity in a radio access network (RAN);
create a network graph, with nodes representing the vertices in the radio access network, and edges representing the network connections, based on the calculated relationship strengths;
apply an extended iterative disjoint community detection algorithm for clustering nodes into communities, wherein in each iteration imposed one or more constraints for clustering nodes into the same community are analyzed;
wherein the nodes are at least of a first type and a second type;
wherein a node of the second type comprises or is connectable to multiple nodes of the first type, and wherein a node of the first type does not belong to multiple nodes of the second type;
wherein the program instructions are such that, when run on the processing circuitry of the coordination apparatus, they cause the coordination apparatus to:
first apply the extended iterative disjoint community detection algorithm to nodes of the first type to provide an intermediate result with communities of nodes of the first type; and
subsequently apply the extended iterative disjoint community detection algorithm to the nodes of the second type, with the intermediate result serving as input; and
clustering the nodes of the first and second type for which the constraints are fulfilled into communities of a first and second type, respectively.

* * * * *